Aug. 14, 1962 E. L. SMITH 3,049,094
PADDLE-ACTUATED ANIMAL DRINKING DEVICE
Filed Aug. 21, 1961 2 Sheets-Sheet 1

INVENTOR:
Erwin L. Smith,
BY
Bair, Freeman & Molinare
ATTORNEYS.

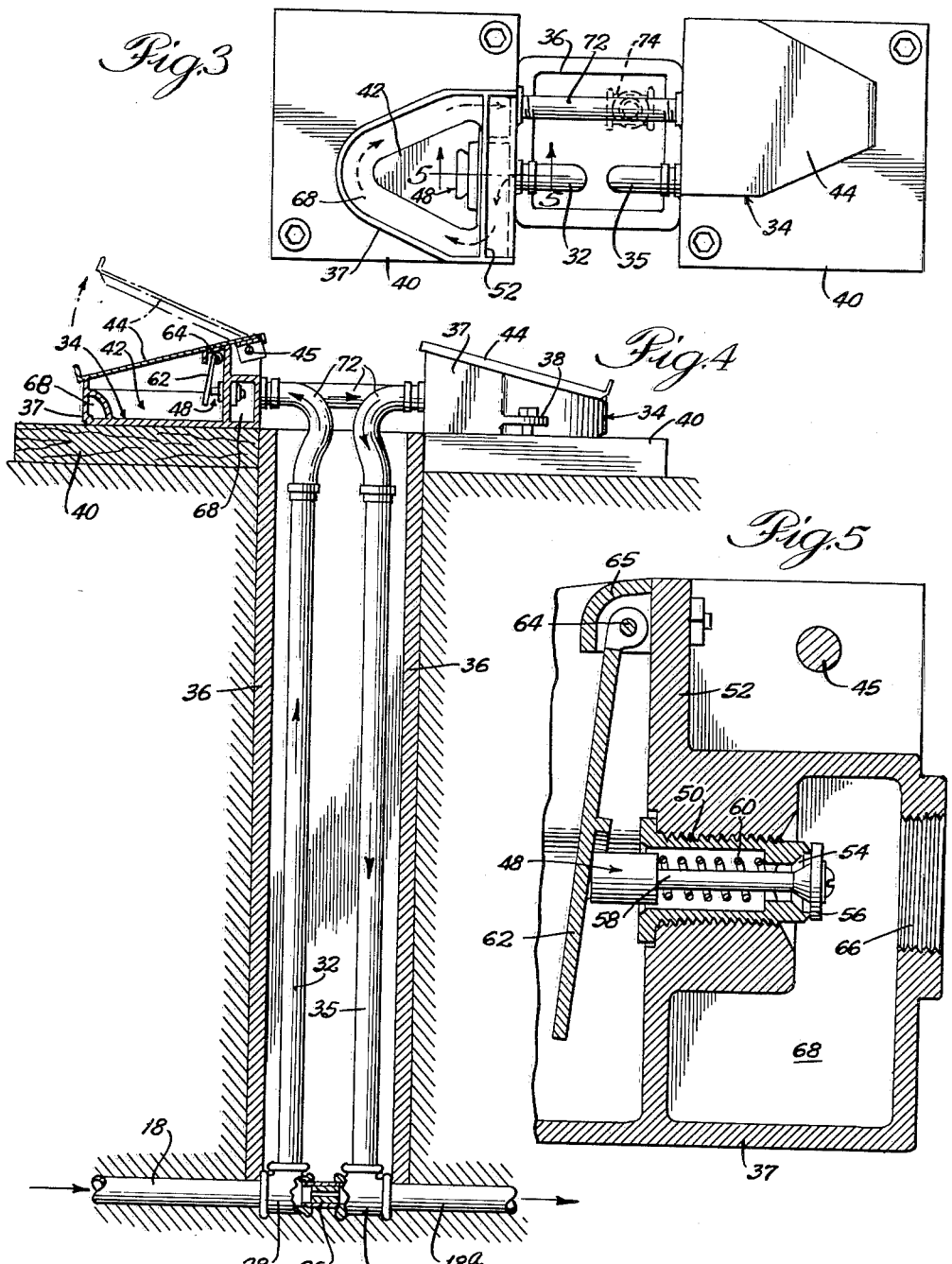

3,049,094
PADDLE-ACTUATED ANIMAL
DRINKING DEVICE
Erwin L. Smith, Cedar Falls, Iowa, assignor to Clay
Equipment Corporation, a corporation of Iowa
Filed Aug. 21, 1961, Ser. No. 132,739
5 Claims. (Cl. 119—75)

This invention relates in general to a water supply system for animals and more particularly to a paddle-actuated valving means for a water supply system in which the water is continuously circulated from an underground source and which is supplied at an animal's option to a drinking chamber.

Underground water systems employing continuously circulating water have been used for supplying animals with comparatively warm water in winter and comparatively cool water in summer. One of the important problems arising in supplying the water during the winter season results from the water freezing in the drinking chamber under severe weather conditions. With the type of water systems disclosed herein, the drinking chamber enables the animal to have access to the water and the chamber is at least partially surrounded and heated by the circulating underground water. In the winter, the comparatively warm water that circulates around the drinking chamber is intended to maintain the water in the drinking chamber or pan above freezing. This solution is not entirely satisfactory, however, since the water from the bath was usually fed into the drinking chamber through a float valve which is subject to disorder, and is large and expensive, and which maintains a certain minimum water level in the chamber. With such an arrangement, a considerable quantity of water is retained in the drinking chamber at all times and therefore the surface area of the water is subject to freezing. Thus, either an inordinate rate of heat transfer is required from the circulating water supply, or the water freezes and access thereto by the animal becomes difficult, if not impossible.

To avoid this problem, an arrangement is proposed whereby water is admitted to the drinking chamber only at the animal's option. This is done primarily by substituting a pressure-responsive paddle valve for a float valve. The animal presses his head against the paddle valve when he desires to drink, thereby allowing water to enter the chamber only while the animal is operating the valve. This results in the admission into the drinking chamber of only an amount of water desired by the animal, and since only a small quantity of the water may remain in the drinking chamber the heat transfer requirements of the system are considerably lessened, with the result that danger of the water freezing in the bowl or around the valve is considerably reduced.

The principal object of the present invention is, therefore, the provision of an improved animal water supply system in which the danger of the water freezing and access thereto being prevented is considerably reduced.

The above and other objects of the present invention will become more apparent upon examination of the following specification, claims and drawings wherein:

FIGURE 3 is a top plan view of the arrangement of a pair of adjacent bowl assemblies;

FIGURE 4 is a side elevational view of the adjacent bowl assemblies of FIGURE 3; and FIGURE 5 is an enlarged cross sectional view along the line 5—5 in FIGURE 3, and which illustrates a typical valve arrangement that may be used with the bowl assembly.

Figure 1:
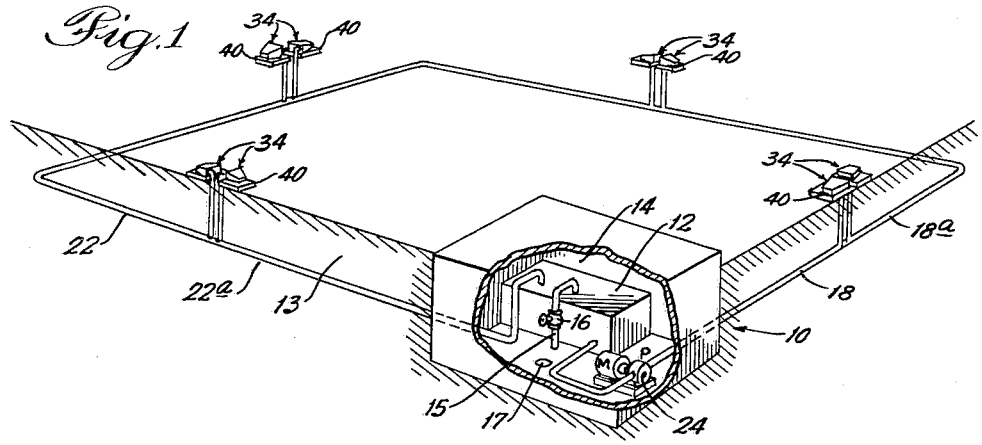
FIGURE 1 is a generally schematic layout in perspective of a circulating water supply system providing animals with access to water from an underground source.
Figure 2:
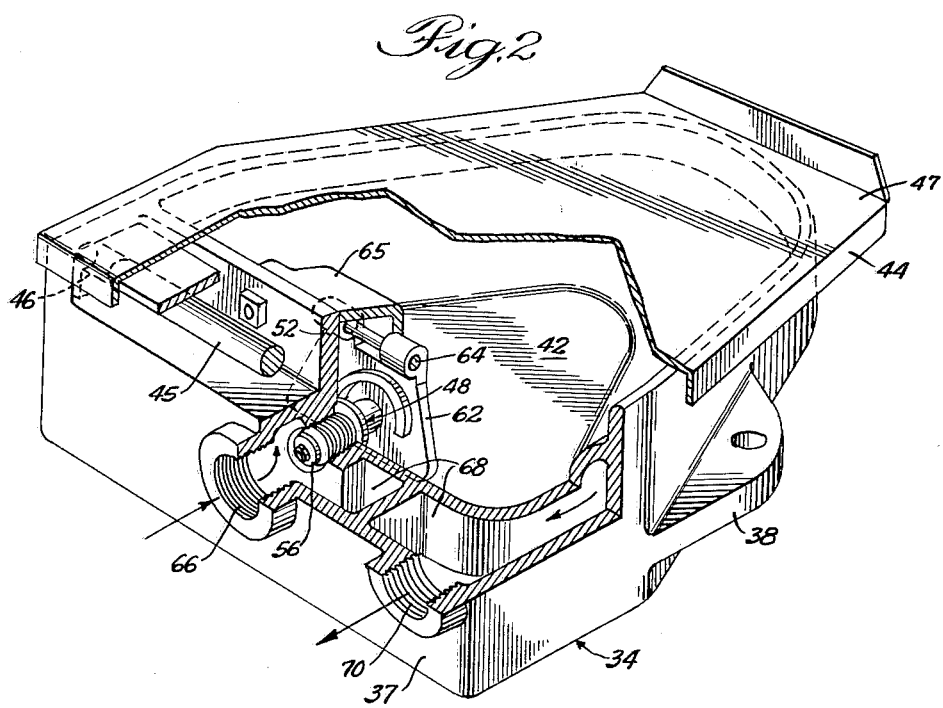
FIGURE 2 is an enlarged perspective view with portions broken away showing the bowl assembly in which the drinking chamber is located.

In FIGURE 1 of the drawings the system in which the water is circulated is illustrated generally by the reference character 10. As will be seen, it comprises a water supply tank 12 in which water is stored submerged below the earth level 13 or in a pit 14. Access to tank 12 and adjacent apparatus in pit 14 may be provided in any well known manner so that repairs may be effected or medicants introduced into the tank 12 if desired. The tank 12 may in turn be supplied from some underground well by means of the pipe 15 and the valve 16. A drain 17 provides an exit for excess water. The water in the supply tank 12 is continuously circulated by means of the motor and pump arrangement 24 through tandem connected pairs of underground pipes 18, 18a—22, 22a, the horizontal runs of which are buried in the earth below the frost line. Suitable valves (not shown) for draining or blocking water flow are of course provided.

The water that circulates from tank 12 flows through horizontal pipe 18 to a watering station where one or more watering bowls are provided and then continues from said station through horizontal pipe 18a to another watering station, and so on until the circuit is completed back to tank 12. At each watering station there is provided an upright passageway through the earth so that the necessary plumbing or piping may extend between the earth-buried pipes 18 and 18a and the watering bowls spaced thereabove substantially at ground level. Preferably, watering bowls are provided in pairs at each watering station, and all watering bowls are in series in the water circulating system. An air vent is provided in the system generally at some point furtherest, or remote, from the pump.

As illustrated in FIGURES 1, 3 and 4, a pair of adjacent earth-buried pipes 18 and 18a have their adjacent ends connected to T-connections 28 and 30 which are interconnected by a restricted, or constricted bypass nipple 26. The T-connection 28 connects to an upright intake riser pipe 32 which leads incoming water from pipe 18 to one drinking bowl assembly, and the other T-connection 30 connects to an upright return pipe 35 which leads return water from the other drinking bowl assembly back to pipe 18a. The bypass 26 permits approximately 25% of the water to flow therethrough without passing to the adjacent watering bowls. The bypass restricts the passage to force the water through the watering bowl and it also permits each loop to be drained by gravity and may be valved to provide selection regulation. The upright earth passageway through which extend pipes 32 and 35 may be framed or lined as at 36.

Each drinking bowl assembly comprises a hollow, or double-walled, body 37 having a pair of apertured horizontal ears such as at 38 to permit the body 37 to be mounted on a support platform 40. The top, or inner portion of the body 37, is provided with a recess or depression 42 which forms the drinking chamber or basin, and this chamber is normally covered by a lid 44 which is secured to elongated pivot rod 45, which in turn is pivotally mounted at its ends, as at 46, on the bowl body 37. The lid 44 has an overlap, or projecting, forward portion 47 which permits the animal to place its nose, or snout, beneath the projecting portion of the lid for raising the same so that the animal may have access to the water within basin depression 42. Water is caused to enter depression 42 by the animal's manipulation through its snout of a paddle valve assembly, generally indicated at 48. The valve assembly 48, as best seen in FIGURE 5, comprises a bushing 50 which is threadably engaged in a lateral wall 52 of the bowl body 37, and said bushing 50 provides an inlet port or aperture 54 by means of which the water may enter the drinking chamber or basin 42. The port 54 is normally closed by a valve 56 that is carried on a reduced stem 58 which extends axially through bushing 50. The valve 56 is normally biased into closed position by a coil spring 60 that surrounds stem 58 and which at one end abuts an annular shoulder defined on bushing 50 and at the other end engages a head carried on stem 58. The head on stem 58 is adapted to be operated by a paddle or lever 62 that is pivotally mounted on a horizontal pin 64 which is carried by bracket 65 which is bolted to the wall 52. Whenever an animal presses its nose or snout against the paddle or lever 62, the valve stem 58 is actuated against the bias of spring 60 to move the valve 56 to open port 54 so that water may enter the chamber 42.

The water entering the chamber 42 is part of the circulating supply of water flowing from pipe 32, for example. This water is normally conducted into the bowl body through an inlet 66 defined at the rear of body 37 and circulates through the enclosed chamber 68 defined by the hollow bowl body 37. The enclosed chamber 68 extends about substantially the entire periphery of the drinking chamber 42, as best seen in FIGURE 3, so that a bath of circulating water is provided that transfers a maximum of heat from the circulating water in chamber 68 to any water in the drinking chamber 42. The enclosed chamber 68 thereby forms part of a normally closed circuit for the circulating water which enters the bowl assembly at 66, then travels about the periphery of the drinking chamber 42, and then exits through a port 70 defined in the rear of body 37 adjacent port 66. The water is forced to take said path by the presence of an internal wall 69 in chamber 68 located between port 66 and port 70. The water leaving port 70 may be conducted to the enclosed chamber 68 of a second bowl assembly 34 by means of pipe 72, for example, and from the second bowl assembly, the water is returned to the earth-buried circulating system by means of pipe 35. It will be noted that pipes 32 and 35 may be connected to respective openings 66 and 70 by means of flexible couplings 72. As illustrated in dotted lines in FIGURE 3, a faucet or air intake valve 74 may be interposed in pipe 72, as required, to provide for drainage, venting or the like.

For an animal such as a hog or cow to secure access to the water, it simply nudges or lifts the lid or cover plate 47 with its nose, and then presses its nose against the operating plate or paddle 62 to open the port 54. Water then enters the drinking chamber 42 and as soon as the animal releases the plate in order to drink the water the valve automatically shuts off to prevent the entrance of additional water. This insures that only a limited amount of water will be retained in the bowl and since this limited amount of water requires only a minimum of heat transfer in order to be retained above freezing or to be cooled by the circulating water, the proper temperature is easily maintained. In addition, it will be noted that the valve is located some distance above the bottom of the drinking chamber. Therefore, if any water does collect on the bottom of the chamber and does freeze, it will not interfere with the operation of the valve. In this manner the effect of any possible freezing of the inlet valve is minimized. Since the valve 56 is located directly opposite the water intake port 66, said valve 56 is directly in the path of the incoming circulating water, and since the incoming water is warmest, the danger of valve 56 freezing is minimized and at the same time the pressure of the incoming water through port 66 tends to seat valve 56 and this prevents, as much as possible, any backflow, or entrance, of contaminated water from chamber 42 to the circulating system.

One important advantage in the device disclosed herein lies in the fact that the actuating mechanism for controlling entrance of water into drinking chamber 42 occupies relatively little space of chamber 42. Thus, paddle 62 normally is disposed upright and is inclined slightly forwardly from vertical and spaced closely adjacent the wall 52 which bounds the rear of drinking chamber 42. Only slight rearward movement of paddle 62, simply pivoting about pin 64, is necessary to move valve head 56 to effect entrance of water through bushing 50 into chamber 42. The paddle 62 shields the valve stem 58 and prevents the animal from possibly damaging the valve. The lower end of paddle 62 as well as valve stem 58 is spaced above the floor of drinking chamber 42 so that in the event any residue water in chamber 42 freezes, it will not affect the operation of paddle 62 or valve stem 58.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A livestock watering device for use in a continuously circulating water system for supplying livestock with fresh water upon demand by the livestock, said watering device comprising, in combination, means defining a drinking chamber into which water may be selectively discharged from said circulating system and to which an animal has access for drinking the water discharged into said chamber, chamber means for continuously circulating the water from said circulating system around the periphery of said drinking chamber to effect heat transfer from the circulating water to any water in said drinking chamber, to prevent freezing of the water in said drinking chamber in winter and to cool the water in the drinking chamber in the summer, a valve normally biased into a closed position located between said drinking chamber and said chamber means and adapted to be selectively operated by an animal for supplying water into said drinking chamber, and a paddle for actuating said valve positioned in said drinking chamber.

2. A device as set forth in claim 1 including a pivotable lid covering said drinking chamber and adapted to be pivoted by an animal's head in order to enable said animal to have access to said paddle-actuated valve.

3. A device as set forth in claim 1 wherein said chamber means has a horizontally disposed inlet thereto, and said valve is positioned directly opposite said inlet, so that said valve is constantly directly subjected to the incoming water which effects heat transfer therewith and which normally tends to close said valve.

4. A device as set forth in claim 1 wherein the floor of said drinking chamber is spaced beneath said valve and paddle so that any residue water left in the drinking chamber and which may freeze will normally not affect further operation of said paddle or valve.

5. A device as set forth in claim 1 wherein said paddle is disposed upright closely adjacent one wall of said drinking chamber, whereby an animal must normally move away from contact with said paddle in order to drink, thereby preventing discharge of excess water into said drinking chamber.

References Cited in the file of this patent
UNITED STATES PATENTS

| | | |
|---|---|---|
| 910,800 | Edmiston | Jan. 26, 1909 |
| 1,330,438 | Ferris | Feb. 10, 1920 |
| 2,845,046 | Hart | July 29, 1958 |
| 2,914,025 | McMurray | Nov. 24, 1959 |

FOREIGN PATENTS

| | | |
|---|---|---|
| 65,722 | Austria | July 22, 1914 |